INVENTOR
William A. Ringler

BY KARL W. FLOCKS
ATTORNEY

INVENTOR
William A. Ringler
BY KARL W. FLOCKS
ATTORNEY

Aug. 16, 1966 W. A. RINGLER 3,266,663

BOTTLE CARRIER

Filed Feb. 4, 1964 21 Sheets-Sheet 3

INVENTOR

William A. Ringler

BY KARL W. FLOCKS

ATTORNEY

INVENTOR
William A. Ringler

BY KARL W. FLOCKS

ATTORNEY

Aug. 16, 1966 W. A. RINGLER 3,266,663

BOTTLE CARRIER

Filed Feb. 4, 1964 21 Sheets-Sheet 5

INVENTOR
William A. Ringler

BY KARL W. FLOCKS

ATTORNEY

Aug. 16, 1966 W. A. RINGLER 3,266,663

BOTTLE CARRIER

Filed Feb. 4, 1964 21 Sheets-Sheet 6

INVENTOR

William A. Ringler

BY KARL W. FLOCKS

ATTORNEY

INVENTOR
William A. Ringler
BY KARL W. FLOCKS
ATTORNEY

INVENTOR
William A. Ringler
BY KARL W. FLOCKS
ATTORNEY

BOTTLE CARRIER

INVENTOR

William A. Ringler

BY KARL W. FLOCKS

ATTORNEY

INVENTOR

William A. Ringler

BY KARL W. FLOCKS

ATTORNEY

INVENTOR

William A. Ringler

BY KARL W. FLOCKS

ATTORNEY

INVENTOR
Williams A. Ringler
BY KARL W. FLOCKS
ATTORNEY

INVENTOR
Williams A. Ringler
BY KARL W. FLOCKS
ATTORNEY

INVENTOR
William A. Ringler
BY KARL W. FLOCKS
ATTORNEY

INVENTOR
William A. Ringler
BY KARL W. FLOCKS
ATTORNEY

INVENTOR
William A. Ringler
BY KARL W. FLOCKS
ATTORNEY

INVENTOR
William A. Ringler
BY KARL W. FLOCKS
ATTORNEY

INVENTOR
William A. Ringler
BY KARL W. FLOCKS
ATTORNEY

INVENTOR
William A. Ringler
BY KARL W. FLOCKS
ATTORNEY

INVENTOR

William A. Ringler

BY KARL W. FLOCKS

ATTORNEY

INVENTOR
William A. Ringler
BY Karl W. Flocks
ATTORNEY 3,266,663
BOTTLE CARRIER

William A. Ringler, Wayne, Pa., assignor to Diamond International Corporation, New York, N.Y., a corporation of Delaware Filed Feb. 4, 1964, Ser. No. 342,386
6 Claims. (Cl. 220—118)

The present invention relates to a bottle or can carrier and has particular reference to an improved two piece carrier and the methods of forming and assembling this type of carrier.

The manufacturing of bottle carriers is an extremely competitive segment of the paper packaging industry and any method of achieving lower costs can give one company a significant advantage in this market. Also, it is advantageous to be able to manufacture the carrier on existing equipment therefore obviating the necessity of replacing present equipment or maintaining additional machinery to operate on a new type of carrier. In addition, such carriers must be capable of being handled on existing bottle opening, loading and case packaging equipment.

The present invention is concerned with the full depth, full partitioned divider type of carrier which is intended for interstate shipment where maximum protection of bottles is needed. In addition, the practice in use by such shippers sometimes requires using the carriers for several trips from the bottling plant to the store and back again. To withstand such treatment the structural parts of the carrier absorbing the most abuse must be heavily reinforced. In addition, the carrier must be capable of being flattened during storage and then erected and loaded for the next use.

In order to withstand such type of use the carrier of the present invention incorporates certain features. Among these is superior handle strength since this structural member takes more abuse than any other part of the carrier.

Furthermore, interstate shipping regulations specify a minimum material thickness for cushioning between bottles. Preferably this partitioning will extend between the entire area of possible bottle to bottle contact. This regulation will therefore permit the outer part of the carrier to be of thinner material than the inner partitions since the thickness of the outer walls of two adjacent carriers may be considered when computing the thicknesses of cushioning material separating adjacent bottles.

A carrier of this type must also possess the features of a flat folded structure capable of being erected and then folded flat again for storage.

This same type of carrier must be formed with structures suitable for different types of bottled beverages. In some cases the product must be shielded from sunlight and its possible deteriorating effects. Such may be the case with beer. With other types of beverages it is desirable that the greatest possible visibility be afforded the bottles and the advertising thereon. This is desirable with soft drinks and is permissible with some types of bottled beer. The cardboard stock thus saved may be added to the handle for more strength in order that it may have the degree of strength needed by carriers used with beverages in returnable bottles and hence requiring multigrip strength.

Accordingly, the present invention is directed to a carrier structure wherein the handle and the partitions are formed out of a heavier material, where such heavy material is required, combining it on modified existing manufacturing equipment with a lightweight material body member. The total structure is so contrived that it can be shipped flat in completed form to the customer, erected on standard pieces of equipment, and then knocked flat again if necessary.

Furthermore, the present invention provides maximum economy with adequate performance with the material types that may be selected for the carrier pieces due to their layout cut and the method of assembling these pieces into an integral bottle carrier.

An additional advantage of forming the outer and inner carrier pieces from different materials is found in the economic use of a higher grade material on the outer carton so that a finer job of printing may be done on the outer surface.

Basically the carrier of the present invention is a carton having an outer shell and an insert of a separate partition, made in a less expensive manner and having a simplicity of construction not found in the prior art.

These as well as further advantages which are inherent in the invention will become apparent from the following description, reference being had to the accompanying drawings wherein.

Figure 1:
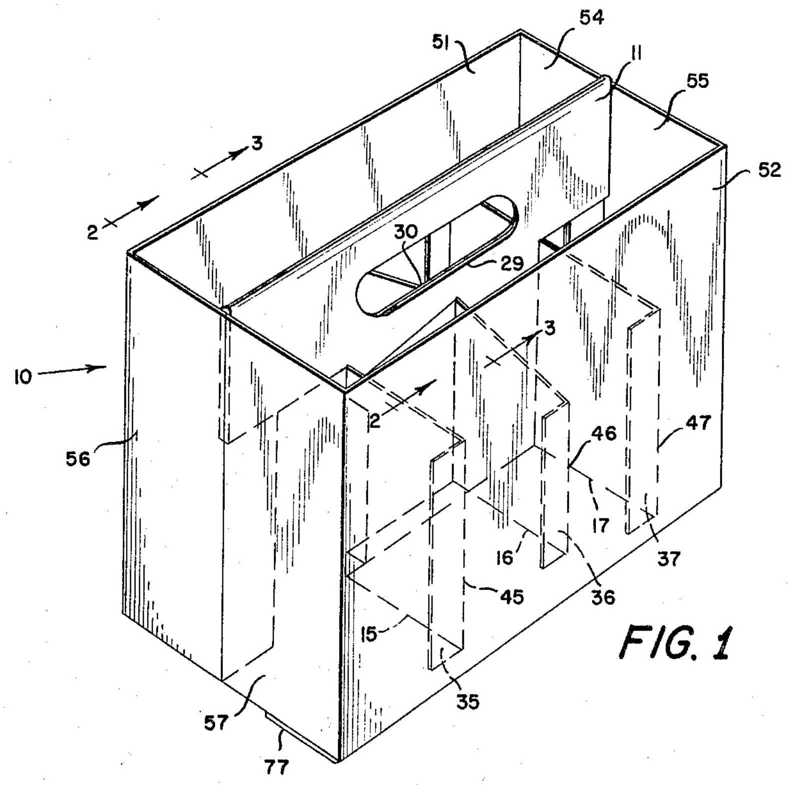
FIG. 1 is a perspective view of one embodiment of a completed carton of the present invention in expanded condition for holding eight bottles with the contents shielded.
Figure 4:
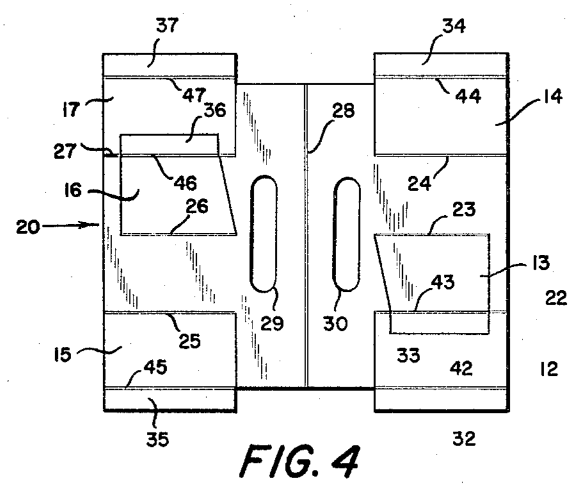
Figure 5:
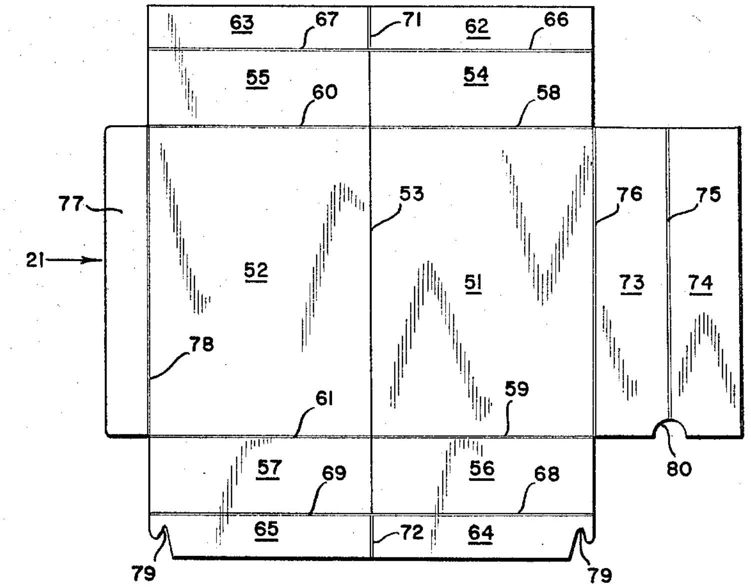
Figure 13:
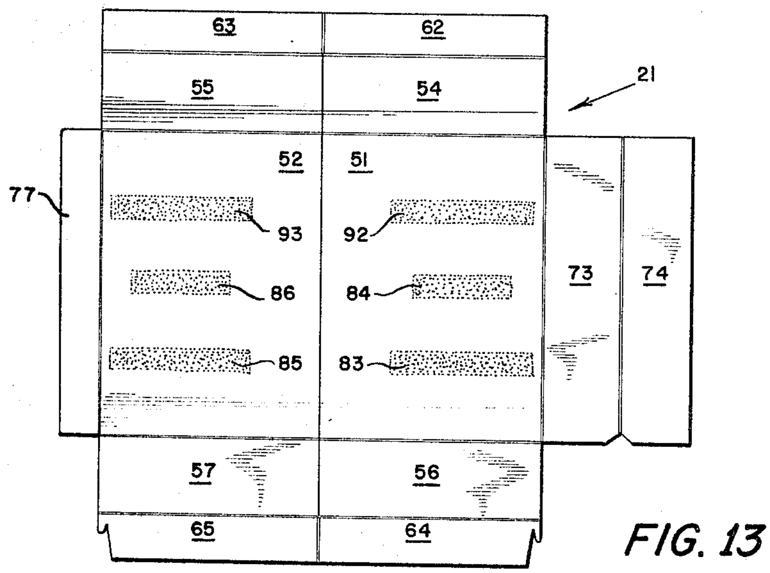
Figure 14:
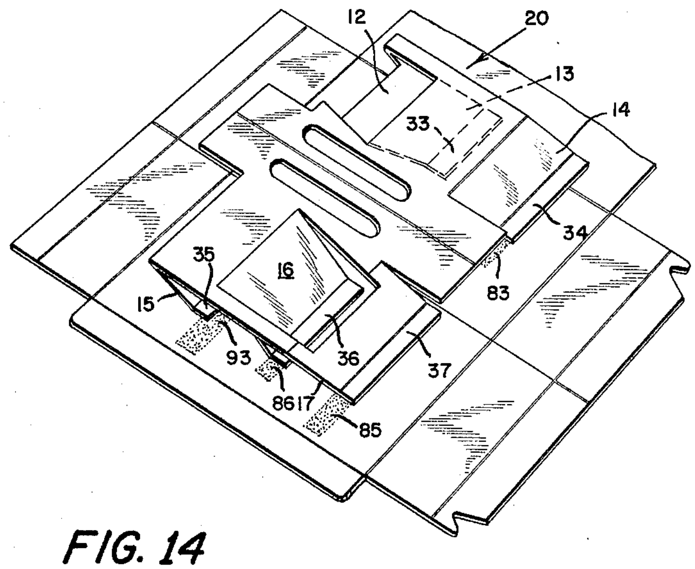
Figure 15:
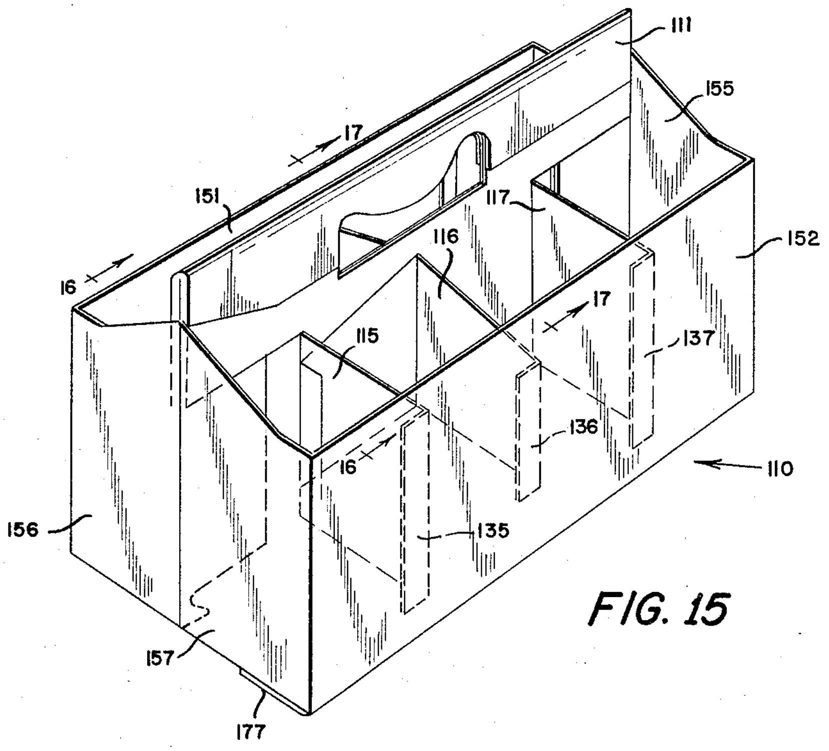
Figures 16, 17:
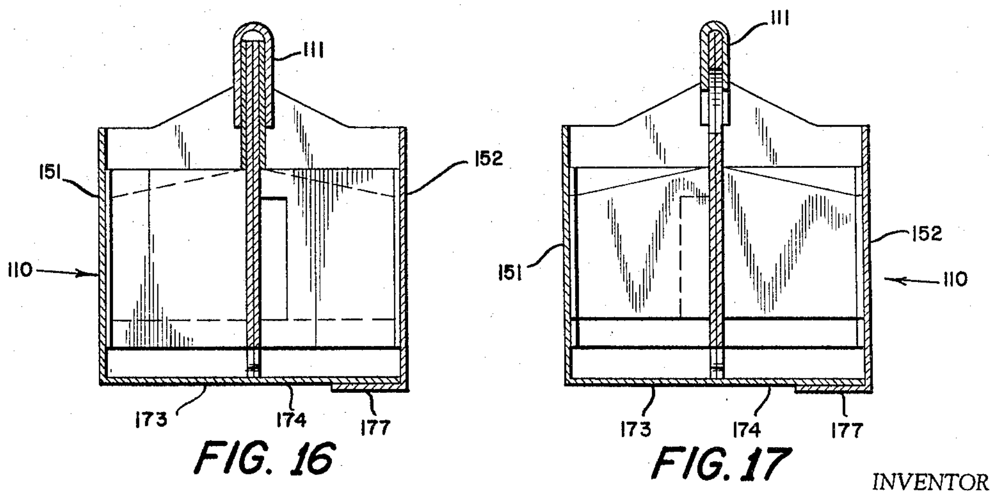
Figure 18:
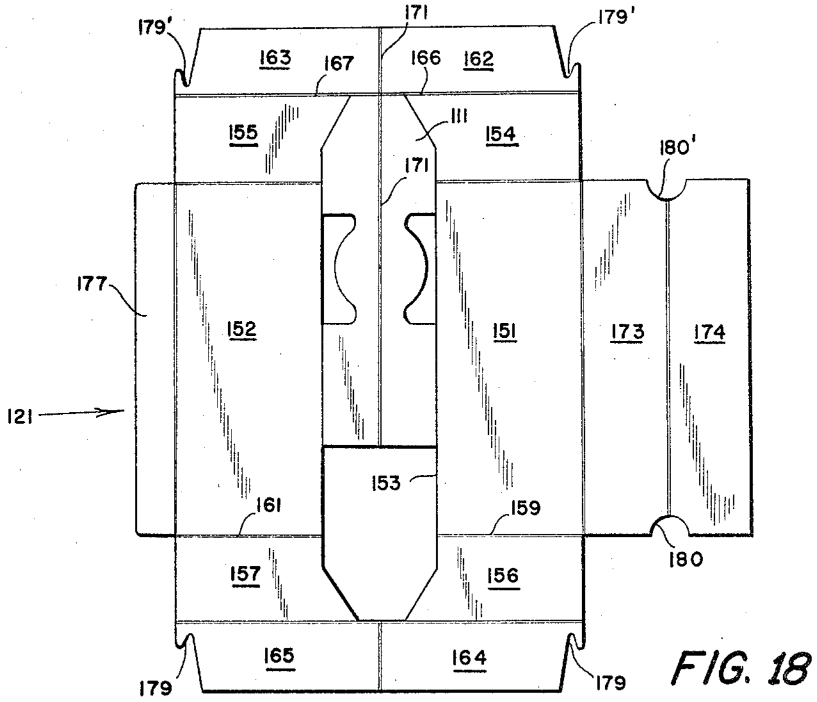
Figure 19:
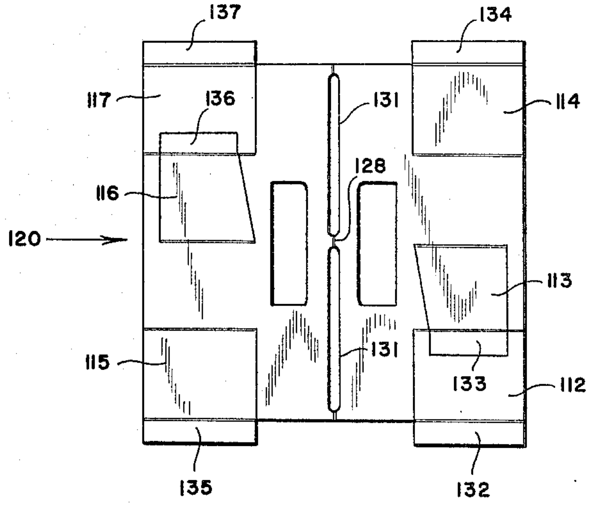
Figure 25:
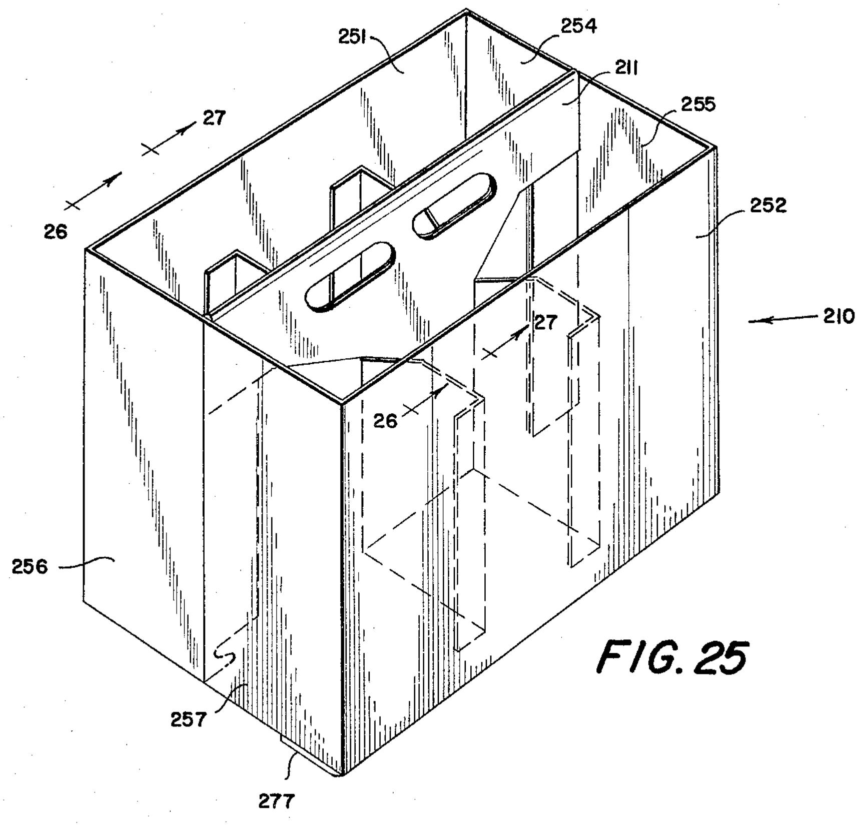
Figure 26:
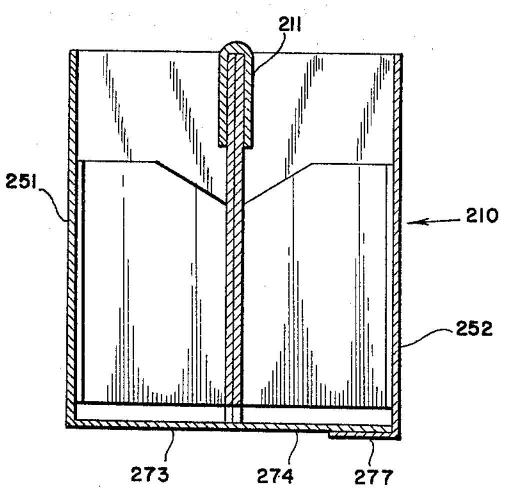
Figure 27:
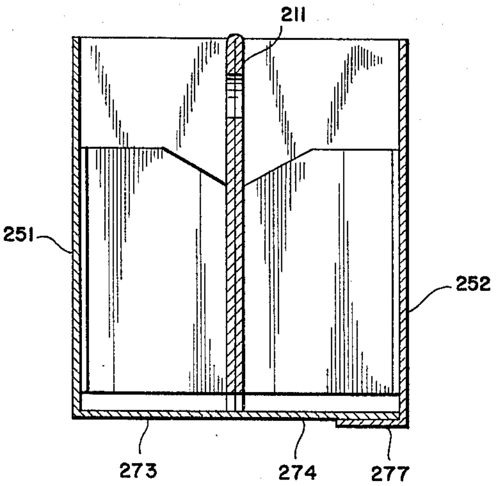
Figure 28:
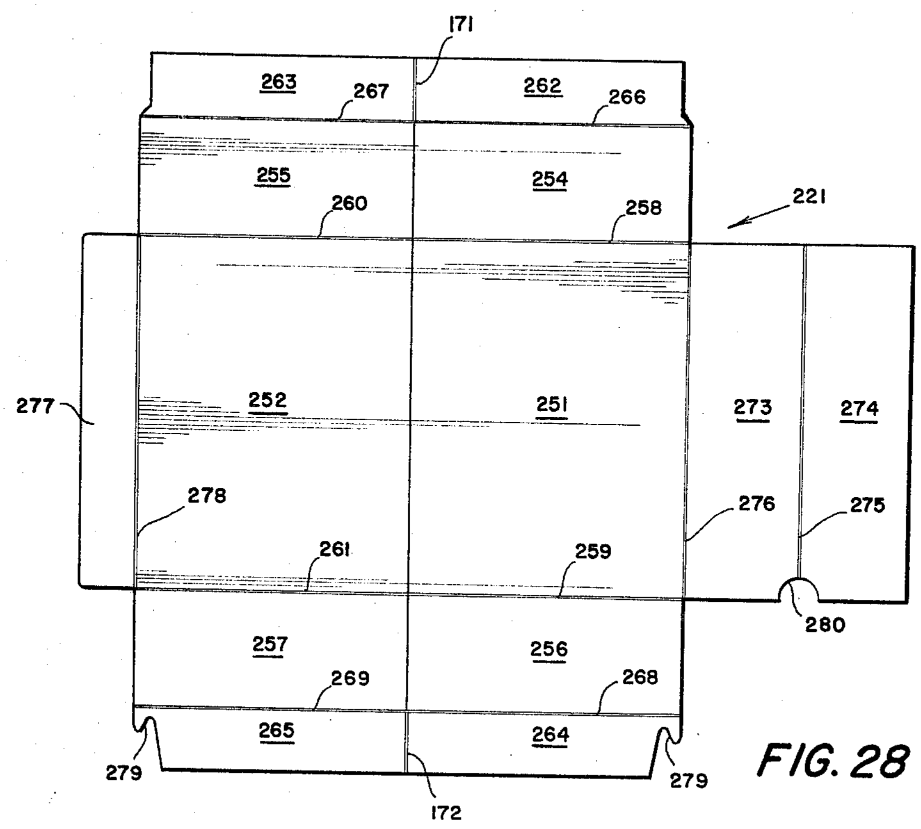
Figure 29:
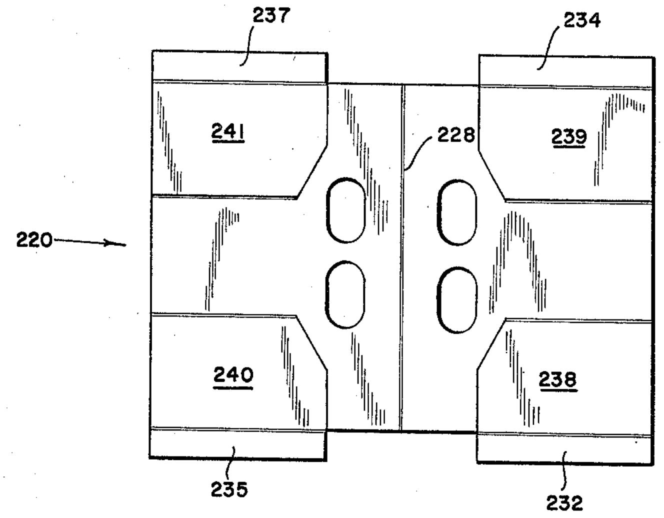
Figure 36:
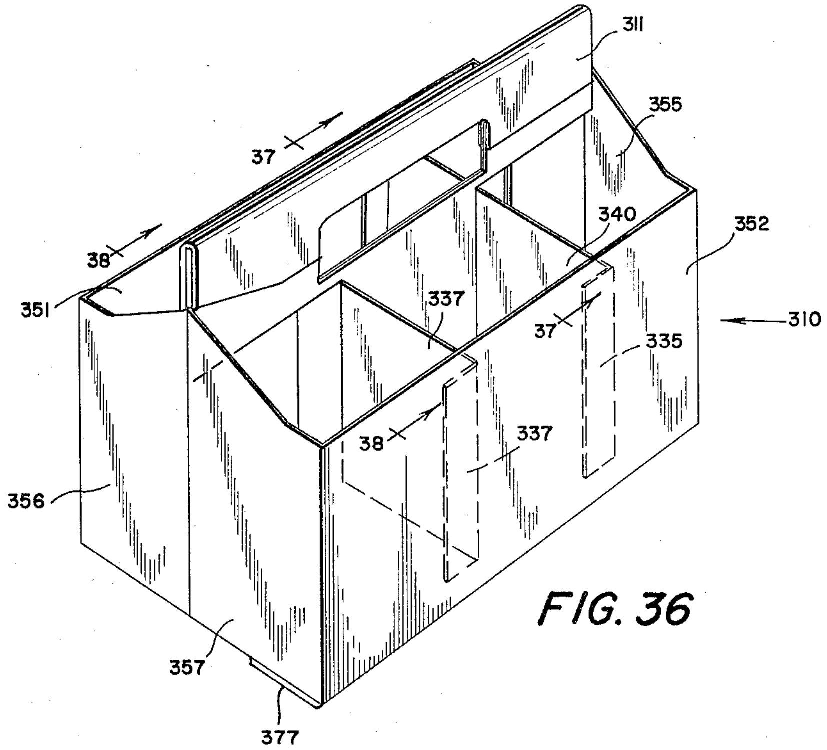
Figure 37:
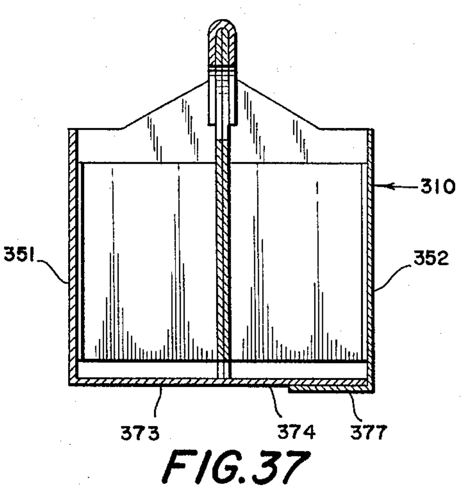
Figure 38:
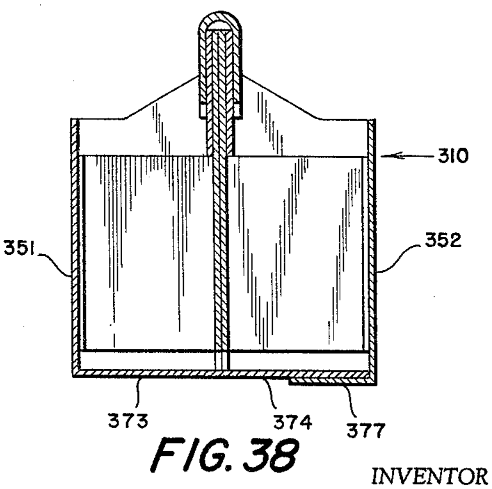
Figure 39:
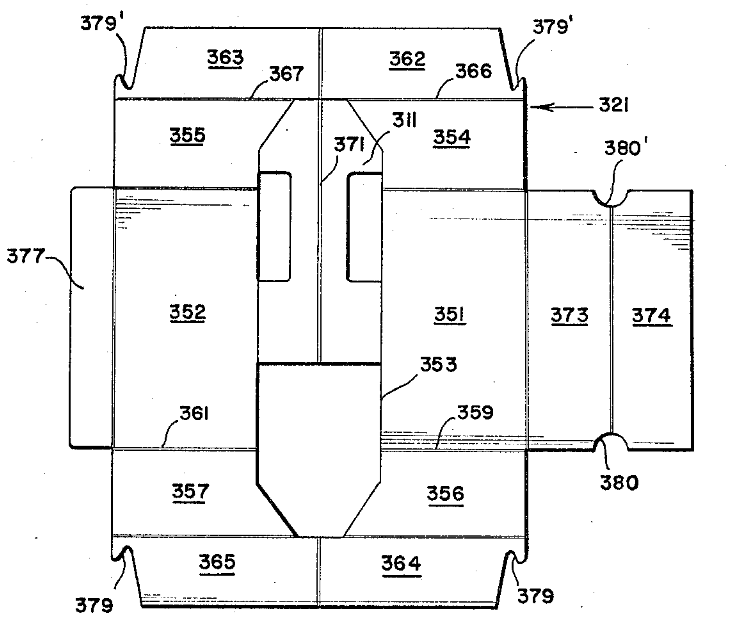
Figure 40:
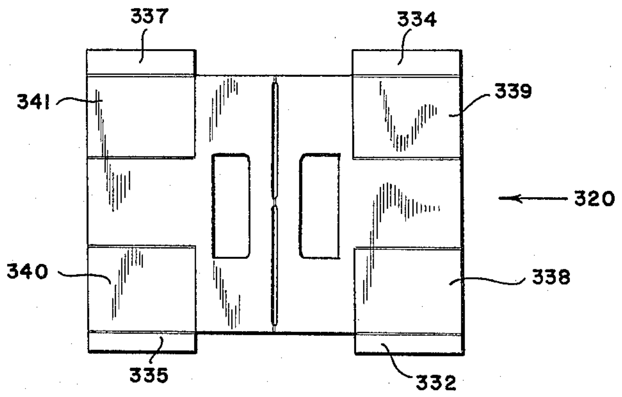
Figure 41:
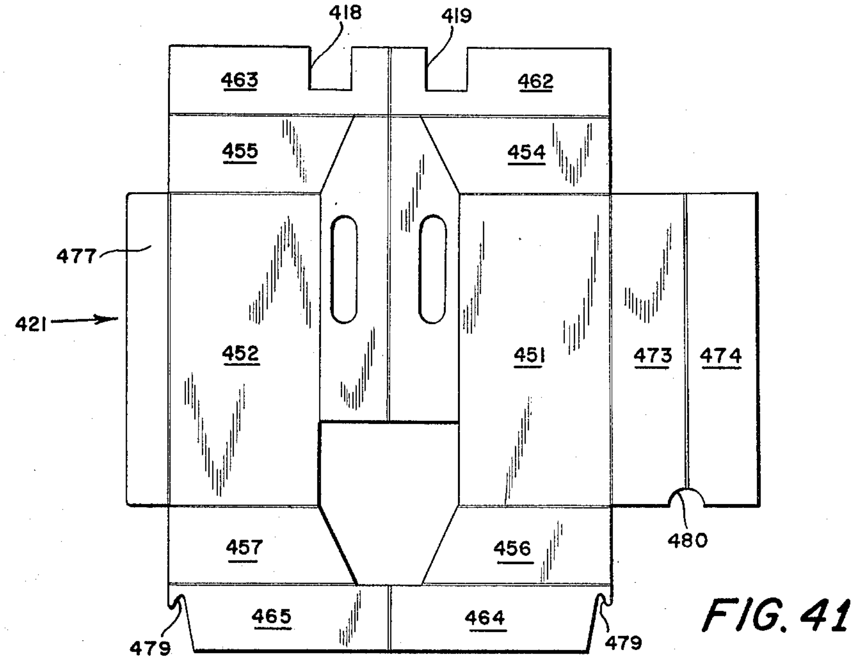
Figure 42:
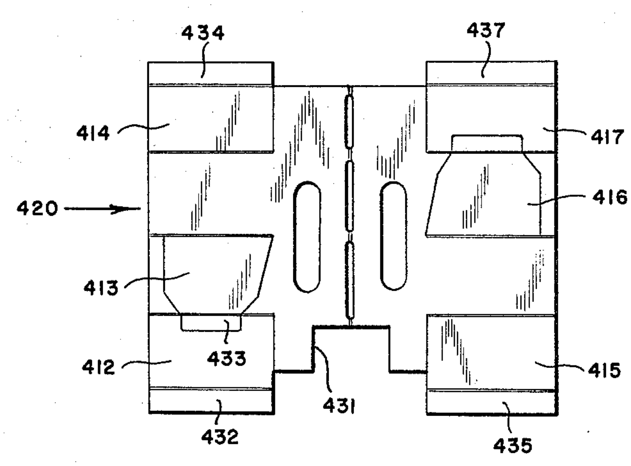
Figure 43:
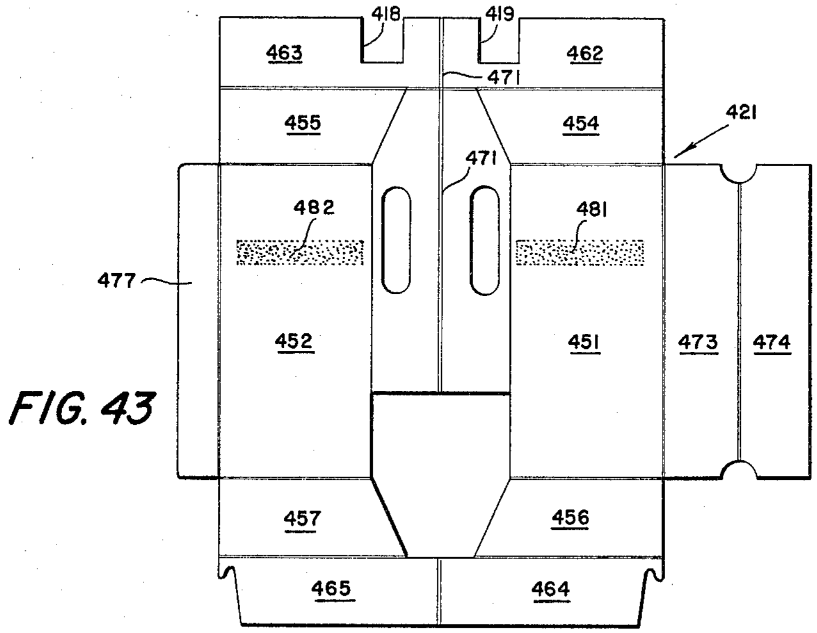
Figure 44:
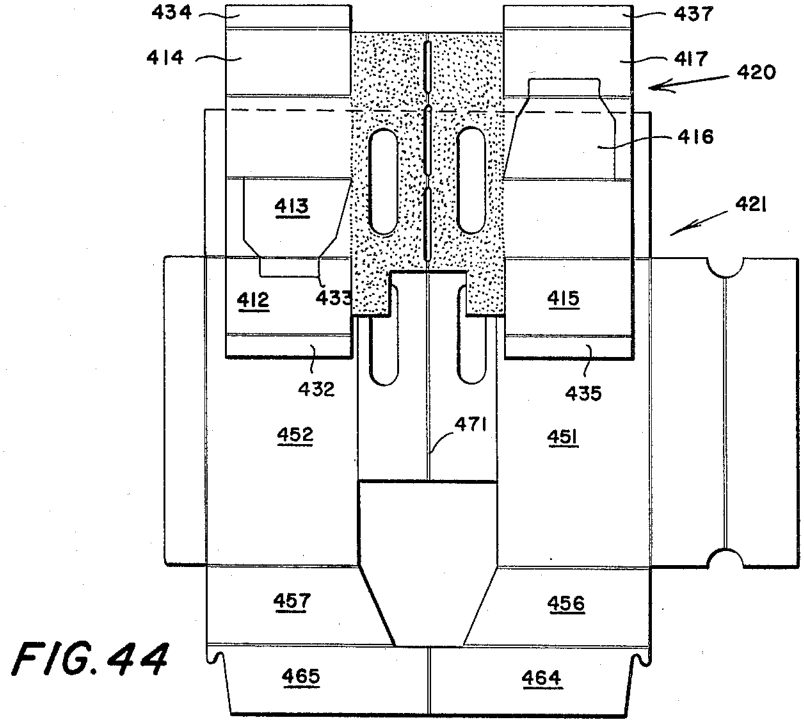
Figure 45:
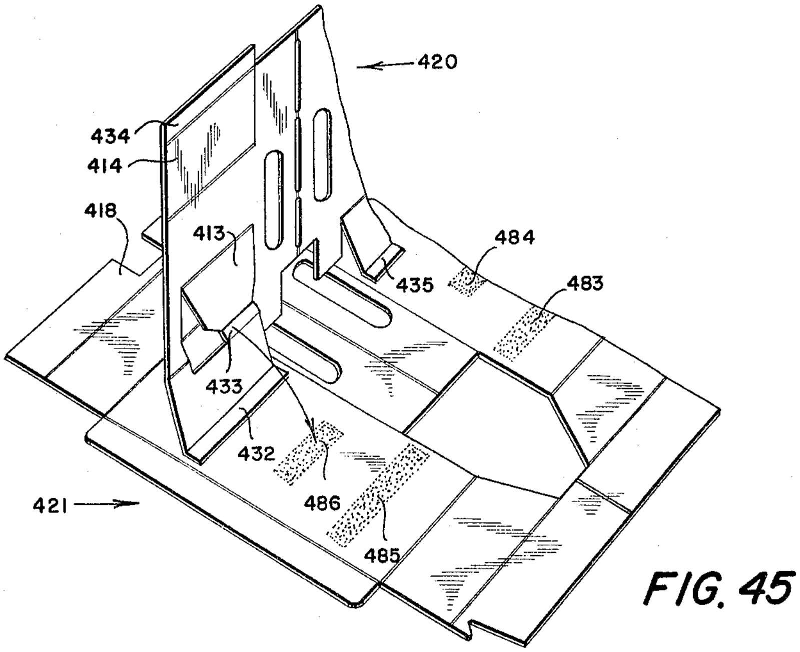
Figure 46:
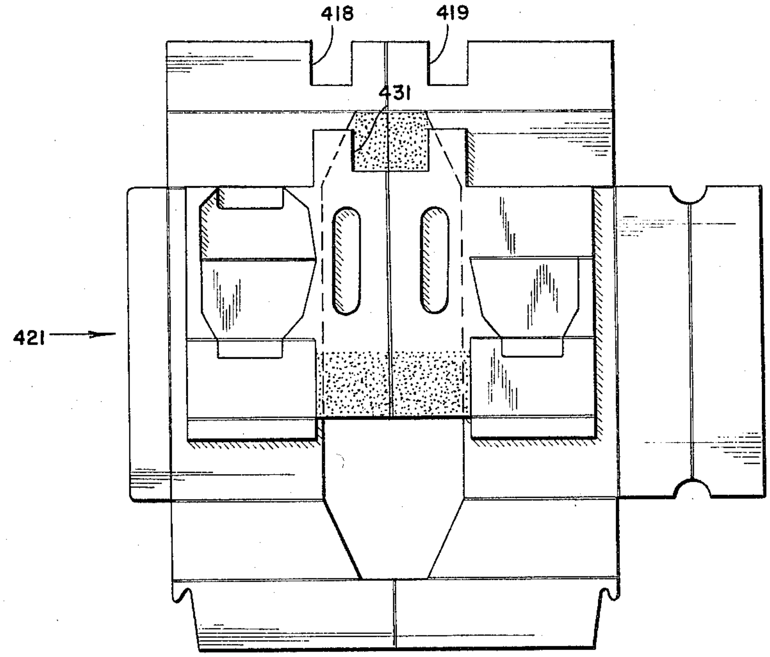

FIG. 4 illutrates an inner blank of the carton of FIG. 1;

FIG. 5 illustrates an outer blank of the carton of FIG. 1;

FIGS. 6–12 illustrate the steps in one of the methods of assembling the carton of FIG. 1;

FIGS. 13 and 14 illustrate a variation in the assembly of the carton of FIG. 1;

FIG. 15 is a perspective view of a second embodiment of a completed carton of the present invention which will hold eight bottles or cans and affords greater visibility of the contents of the carton;

FIG. 16 is a cross section taken along 16—16 of FIG. 15;

FIG. 17 is a cross section taken along 17—17 of FIG. 15;

FIG. 18 illustrates an outer blank of the carton of FIG. 15;

FIG. 19 illustrates an inner blank of the carton of FIG. 15;

FIG. 20–24 illustrate the steps in a method of assembly of the carton of FIG. 15;

FIG. 25 is a perspective view of a third embodiment of a completed carton of the present invention which will hold six bottles or cans and will shield the contents of the carton;

FIG. 26 is a cross section taken along 26—26 of FIG. 25;

FIG. 27 is a cross section taken along 27—27 of FIG. 25;

FIG. 28 illustrates an outer blank of the carton of FIG. 25;

FIG. 29 illustrates an inner blank of the carton of FIG. 25;

FIGS. 30–35 illustrate the steps in a method of assembly of the carton of FIG. 25;

FIG. 36 is a perspective view of a fourth embodiment of the carton of the present invention which will hold six bottles or cans and give a greater visibility of the contents of the carton;

FIG. 37 is a cross section taken along 37—37 of FIG. 36;

FIG. 38 is a cross section taken along 38—38 of the carton of FIG. 36;

FIG. 39 illustrates an outer blank of the carton of FIG. 36;

FIG. 40 illustrates an inner blank of the carton of FIG. 36;

FIGS. 41 and 42 illustrate the outer and inner blanks respectively of a modified form of the carton of FIG. 15; and FIG. 43–49 illustrate the steps in assembling the modified form of the carton.

In regard to the numbering of the parts, all parts of the different hundred series are comparable to the parts numbered with the same last two digits. Therefore a number of any hundred series not discussed should be considered comparable to the part of the same last two digits discussed herein.

Figure 2:
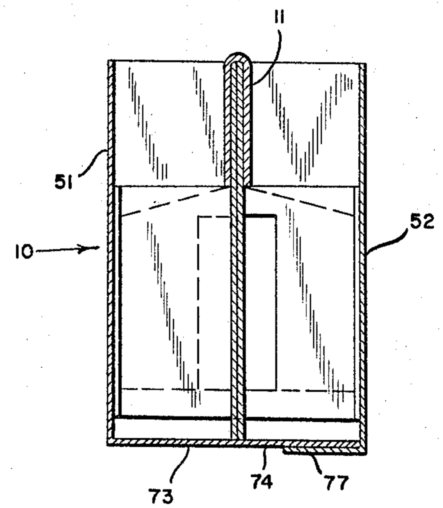
FIG. 2 is a cross section taken along 2—2 of FIG. 1.
Figure 3:
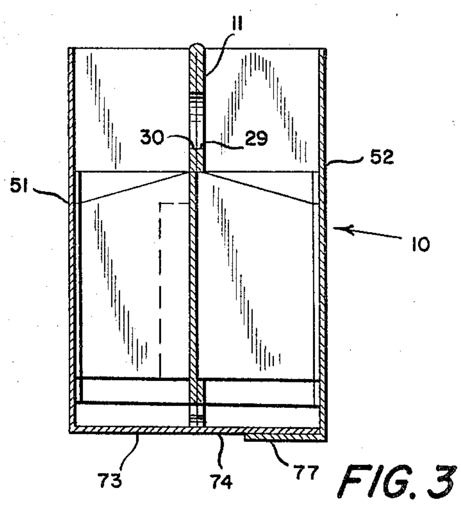
FIG. 3 is a cross section taken along 3—3 of FIG. 1.

One embodiment of a carrier of the type disclosed in the present invention is shown in the perspective view of FIG. 1. Carrier 10 has sides reaching to the bottle neck to shield the product from the sunlight as is necessary with certain bottled products. The section views of FIGS. 2 and 3 illustrate the doubled material forming handle 11 of carton 10. Inside partitions 12–17 formed by cutouts from the center section divide the carrier into four compartments on each side of the handle enabling eight bottles to be carried and shielded from each other by the intervening material of the carton.

Inner blank 20 and outer blank 21 are illustrated in FIG. 4 and 5 respectively. These blanks when assembled by the methods to be shown will form the finished carton of FIG. 1. Inner blank 20 is composed of cutout sections 12–17 which form partitions in the finished carton 10. These cutout sections are attached to inner blank 20 at fold lines 22–27, respectively. On each of the cutout partitions 12–17 are found end flaps 32–37, respectively connected by fold lines 42–47 to the respective partitions.

During assembly, when blank 20 is folded along fold line 28 slots 29 and 30 will coincide to form a convenient hand grip in handle 11 of carton 10.

Outer blank 21 which may be of a lighter material than inner blank 20 and still conform to shipping regulations and which will probably be made of a higher grade material to accept printing on its outer surface is cut in a form shown in FIG. 5. Side panels 51 and 52 are separated by slit 53 which also extends between end panels 54 and 55 and end panels 56 and 57. End panels 54 and 56 are connected to side panel 51 at fold lines 58 and 59 respectively. End panels 55 and 57 are connected at fold lines 60 and 61 respectively in the same manner. End flaps 62–65 are connected at fold lines 66–69 respectively to end panels 54–57 respectively. Fold line 71 connects end flaps 62 and 63 and fold line 72 connects end flaps 64 and 65. Bottom panels 73 and 74 connected by fold line 75 are in turn connected to side panel 51 by fold line 76. Bottom flap 77 is connected to side panel 52 by fold line 78. Notches 79 in end flaps 64 and 65 will coincide with each other and will cooperate with notch 80 on the bottom panels 73 and 74 as later described.

There are several procedures that may be followed in assembling the carton shown in FIG. 1 from blanks 20 and 21 illustrated in FIGS. 4 and 5 respectively. Several of these methods are described herein. The method that would be most preferred would be dependent upon the machinery presently available to the carton assembler so that the least modification to this machinery may be made therefore keeping the expenses of the assembler at a minimum.

Figure 6:
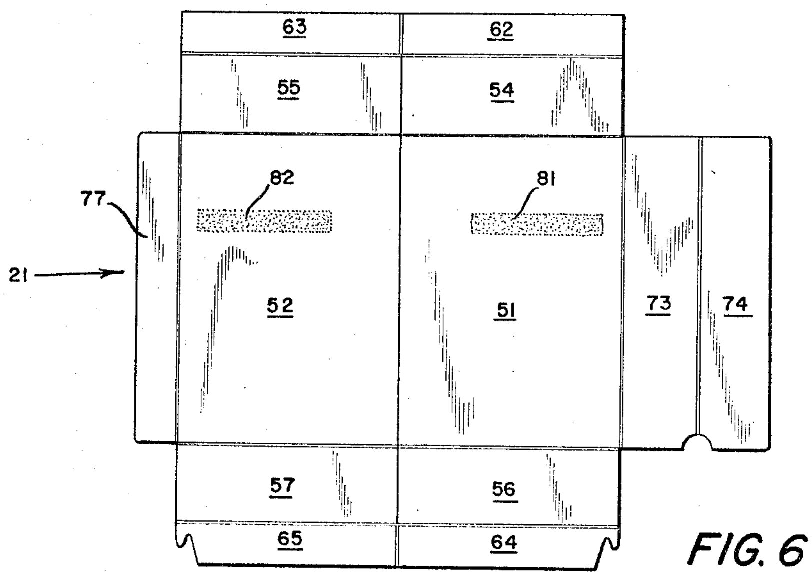
Figure 7:
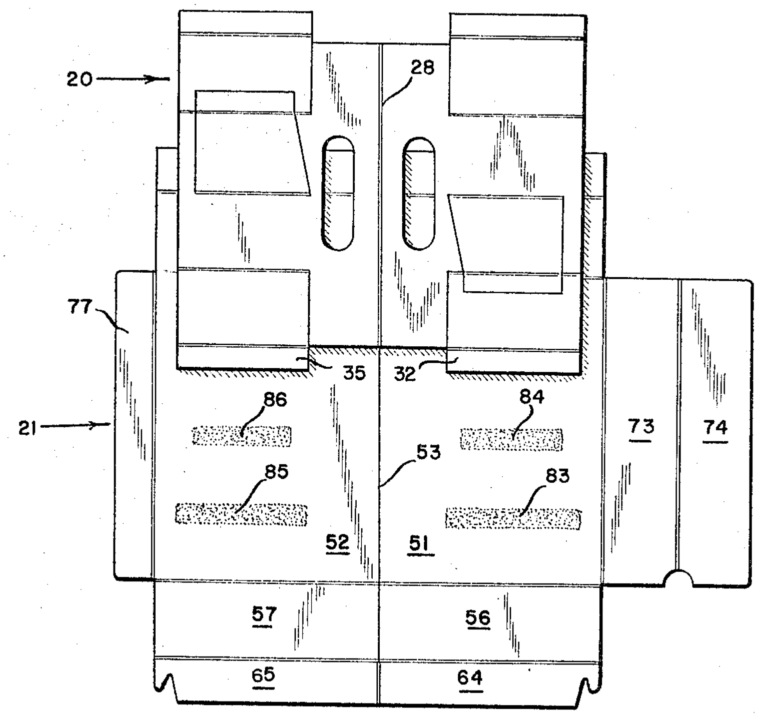
Figure 8:
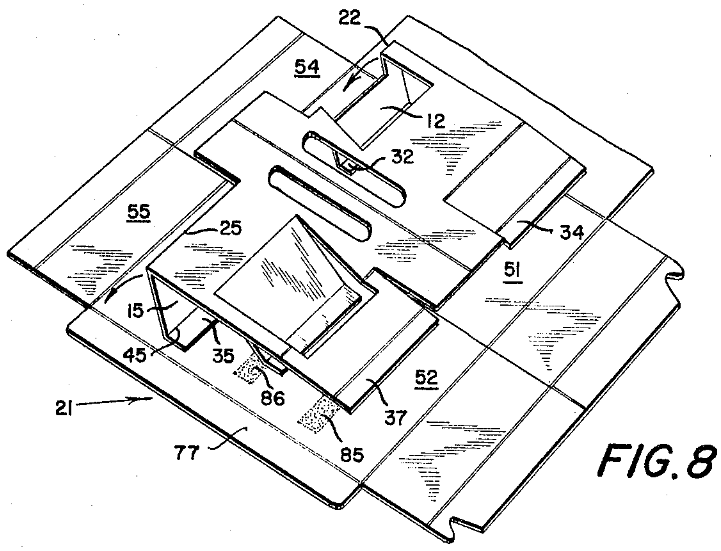
Figure 9:
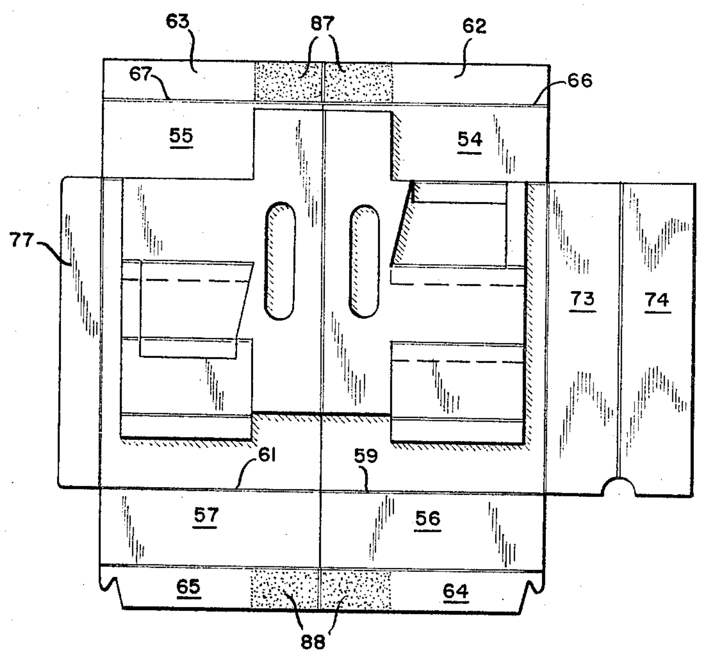
Figure 10:
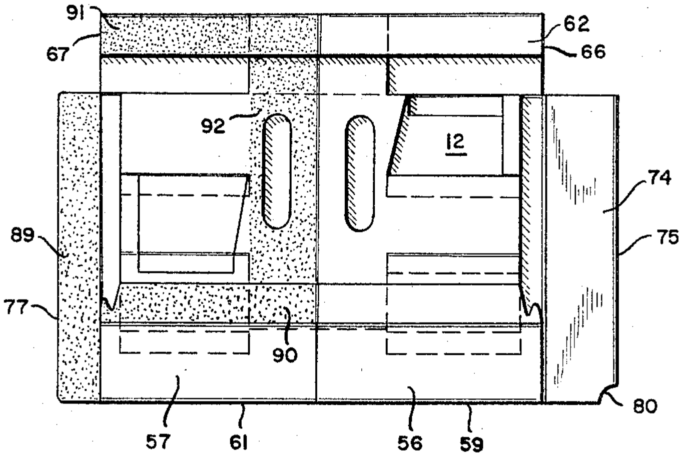
Figures 11, 12:
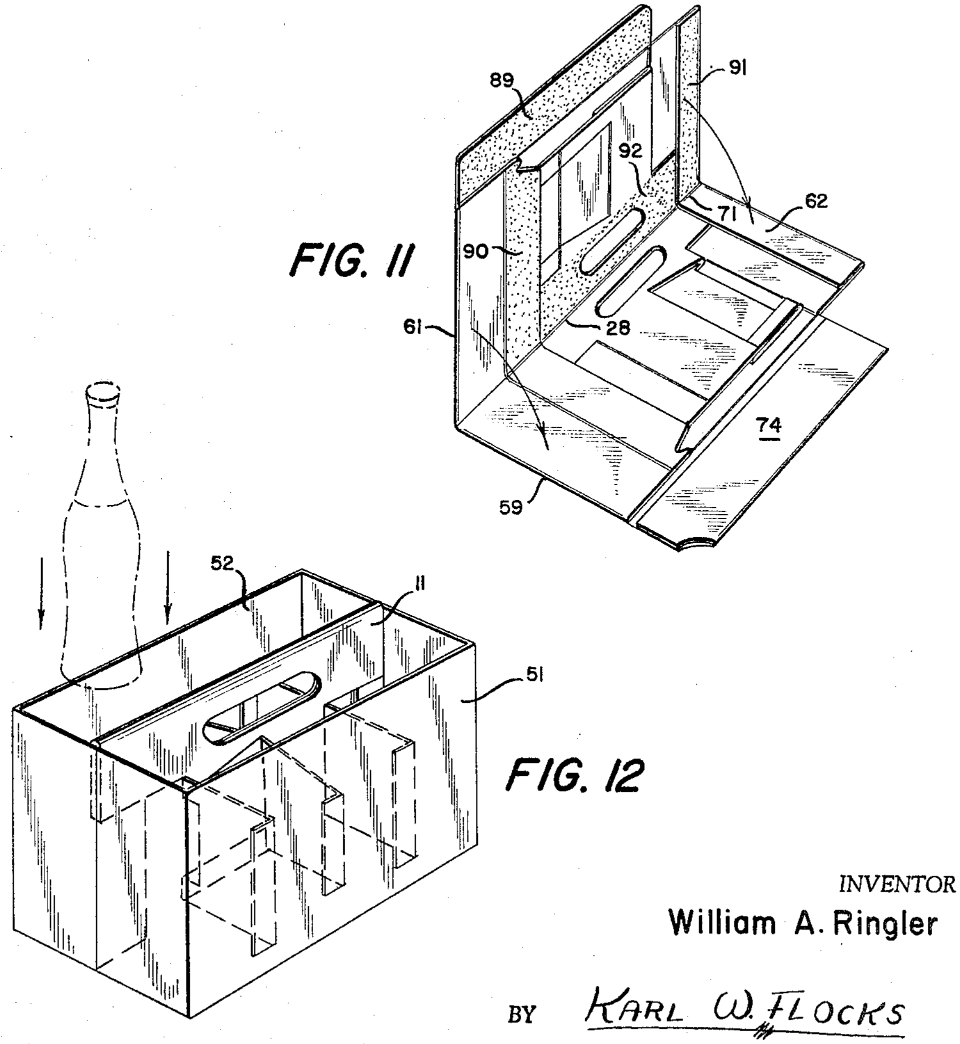

One method of assembly of the carton of FIG. 1 is illustrated in FIGS. 6–12, inclusive. FIG. 6 is similar to FIG. 5 except that the first step is shown in the assembly process which is the application of a quick setting or plastic glue applied to areas 81 and 82 as shown. Inner blank 20 is then placed on top of outer blank 21 with end flaps 32 and 35 contacting the plastic glue areas 81 and 82 with their bottom surfaces. A slower drying glue is now applied to areas 83 and 84 of side panel 51 and areas 85 and 86 of side panel 52 as shown in FIG. 7. Cutout partition 13 is then folded back against blank 20 along fold line 23. The partial perspective view of FIG. 8 shows the next step wherein inner blank 20 is folded on fold lines 42 and 45 while end flaps 32 and 35 are held in position on areas 81 and 82 by the plastic glue thereon. Having been folded in this manner, the positions of inner blank 20 and outer blank 21 in relation to each other are illustrated in FIG. 9. A glue is then applied on areas 87 and 88 partially covering the inner surface of end flaps 62, 63 and 64, 65 as shown in FIG. 9. End flaps 62, 63 are then folded along fold lines 66, 67 and the section comprising end panels 56, 57 and end flaps 64, 65 are folded along fold lines 59, 61. In this folded position glue is applied to the areas as shown in FIG. 10. These areas include surface 89 on the inner surface of bottom flap 77, surface 90 on the outer surface of end flap 65, surface 91 on the outer surface of end flap 63, and surface 92 will become the inside surface of handle 11. The whole assembly is then folded along the center fold lines and slit 53 as shown in FIG. 11. The carton may be shipped or stored in this position thus allowing the slower setting glue to adhere to the adjacent surfaces. Although a fast setting glue or plastic glue was used only in the first step, this does not prevent its use in other steps in assembling of the carton but actually a fast setting glue is necessary only in the first step as stated.

When the carton is ready to be used it may be opened along slit 53 and the inside partitions will be extended out of their collapsed positions as shown in FIG. 12. The carton may be retained in this opened position by the engagement of notches 79 in notch 80.

The carton shown in FIG. 1 may also be assembled by a method differing slightly from the method just described. In this alternate method outer blank 21 shown in FIG. 13, which has the same shape as blank 21 previously disclosed, has a slow drying glue spread over areas 92, 93, 83, 84, 85 and 86. No fast drying or plastic glue is necessary in this method of assembly. As then shown in FIG. 14 inner blank 20 with flaps 12 and 15 folded under the blank is dropped or lowered on top of outer blank 21 aligned in such a manner that end flaps 34, 33, 32, 37, 36 and 35 are laid in contact with glue areas 83, 84, 92, 85, 86 and 93, respectively. Glue is then applied and further assembly of the carton takes place as previously shown and described in FIGS. 9–12.

In FIG. 15 is shown the type of carton previously discussed which is used when greater visibility such as is desirable with soft drinks is required. This carton has lower sides than the carton shown in FIG. 1, but like the carton of FIG. 1 is partitioned into eight compartments. The inner blank 120 shown in FIG. 19 is essentially the same as inner blank 20 shown in FIG. 4. The only differences are slots 131 on center fold line 128 which facilitate the folding of inner blank 120 during its assembly.

The outer blank 121 shown in FIG. 18 differs in several respects from the outer blank in FIG. 5. Besides notches 179 and 180 which are comparable to the notches shown on the outer blank in FIG. 5 there are also notches 179′ and 180′ illustrated in FIG. 18. These may not be particularly necessary but they do tend to strengthen the hold on the bottom of the carton when it is assembled.

The major difference in the outer blank 121 illustrated in FIG. 18 from that previously shown and that which affords the greater visibility of the contents is the wide slot 153 and the handle piece 111 suspended in this slot and cut out except where it is attached to outer blank 121 near the intersection of fold lines 167 and 166 and fold line 171. In this case fold line 171 extends through the center length of handle section 111. In other respects the blanks of this embodiment of the carton of the present invention are the same as previously discussed. Therefore, the same methods of assembly previously discussed may be used with this carton also.

An additional method of assembly is illustrated in FIGS. 20–24. Although this method is illustrated in connection with the blanks 120 and 121 to form the carton of FIG. 15, this method of assembly may be used equally well with the blanks 20 and 21 to form the carton of FIG. 1.

Figure 20:
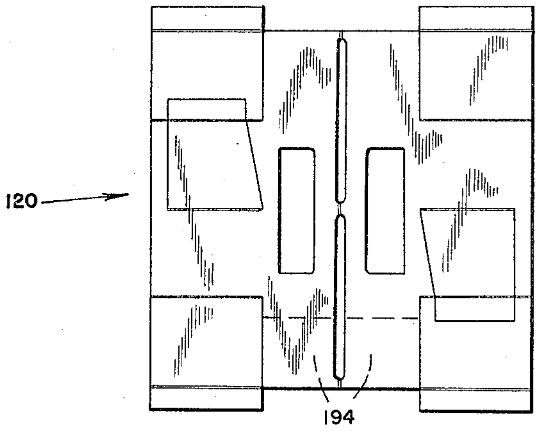
Figure 21:
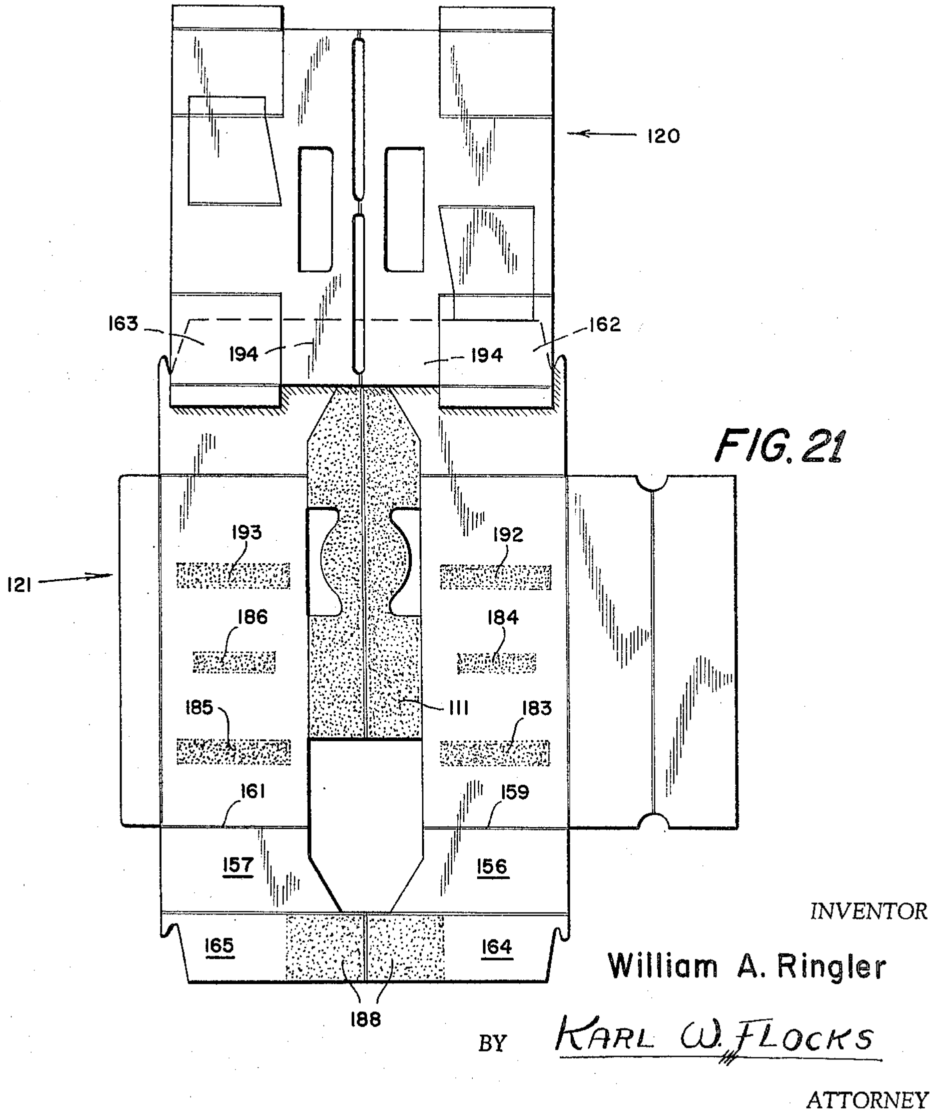
Figure 22:
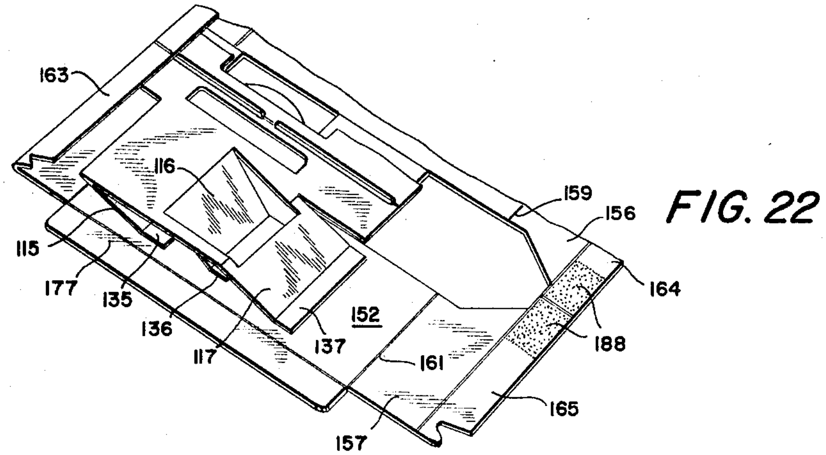
Figure 23:
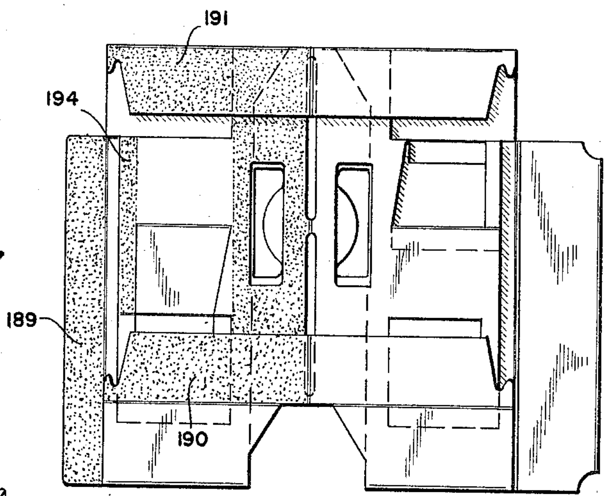

In FIG. 20 there is shown inner blank 120 with an area 194 on its under side to which a plastic or quick drying glue has been applied. Inner blank 120 is then placed in an overlapping position to outer blank 121 as shown in FIG. 21. The area 194 to which plastic glue has been applied on the underside of inner blank 120 then comes to rest on the inner surfaces of end flaps 162 and 163 and centered on fold line 171. A regular slow drying glue is now applied to handle area 111 and surfaces 183, 184, 192, 185, 186, 193 and 188 as illustrated in FIG. 21.

Figure 24:
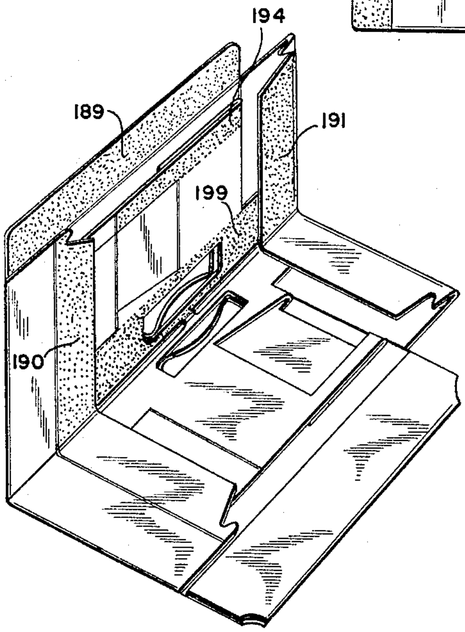

End flap 162–163 is now folded along fold line 166–167 thereby causing the inner blank 120 to be turned over. Inside partitions 115, 112, 113 are folded along their respective fold lines during the turnover process as shown in the partial perspective view of FIG. 22. The end flaps on all of the inside partitions now come to rest against the glued surfaces 183, 184, 192, 185, 186 and 193. The center part of inner blank 120 comes to rest against the glued surface of handle section 111. End panels 156, 157 with end flaps 164 and 165 are folded along fold lines 159 and 161 respectively to the position shown in FIG. 23. Glue is then applied to surfaces 191, 194, 199, 189 and 190 and the assembly is then folded along the center fold lines as shown in FIG. 24 to complete the assembly of the carton of FIG. 15. As previously explained in regard to FIG. 1, the carton is maintained in this condition until it is ready to be used and then the partitions are extended along with the sides to form the carton and carrier of eight bottles or cans.

The cartons embodying the invention as illustrated in FIG. 1 and in FIG. 15 may, by a modification of the inner blanks, be formed to hold six bottles or cans instead of the eight of the previous embodiments. FIG. 25 illustrates such a carton comparable to the embodiment found in FIG. 1. FIGS. 26 and 27 show this carton in sectional views. As will be noted, the outer blank 221 is similar in all respects to outer blank 21 shown in FIG. 5. The inner blank 220 has been modified from blank 20 and 120 used in previous embodiments since only six compartments are required in this form. Inner blank 220 is composed of four flaps 238, 239, 240 and 241 as illustrated in FIG. 29.

Figure 30:
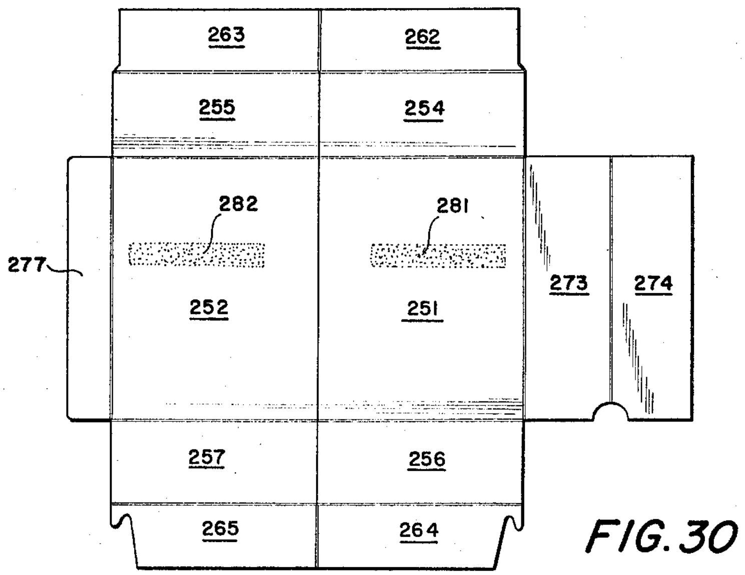
Figure 31:
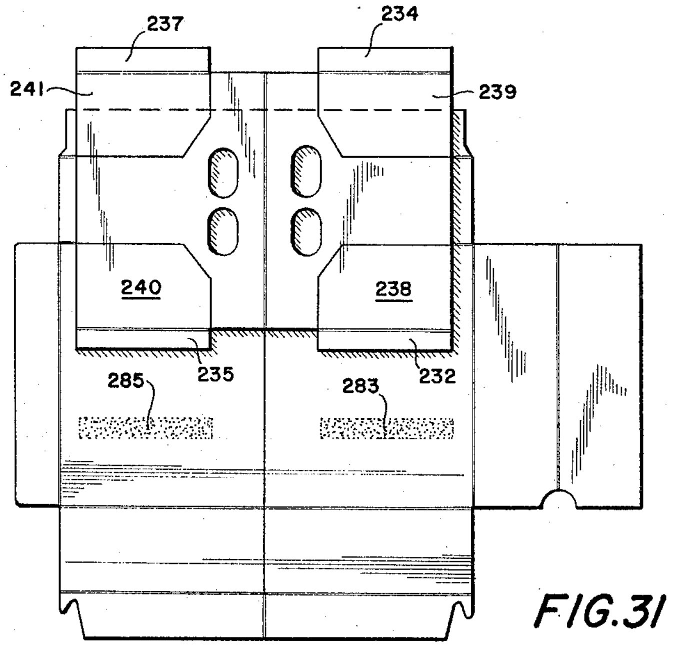
Figure 32:
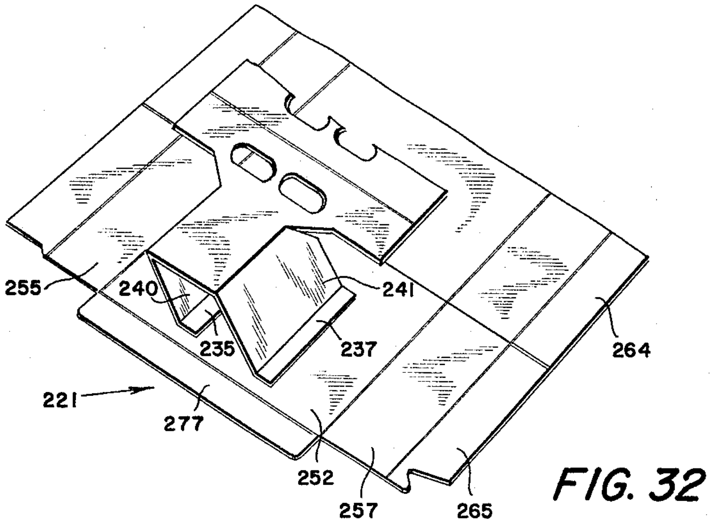
Figure 33:
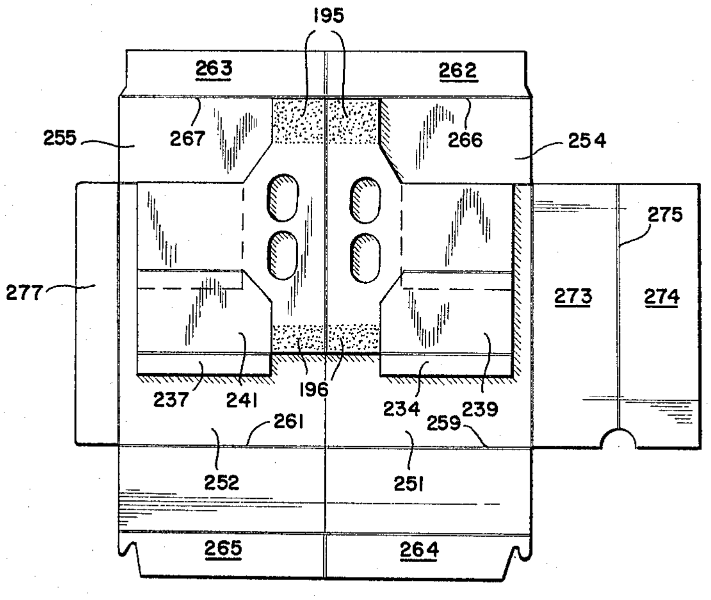
Figure 34:
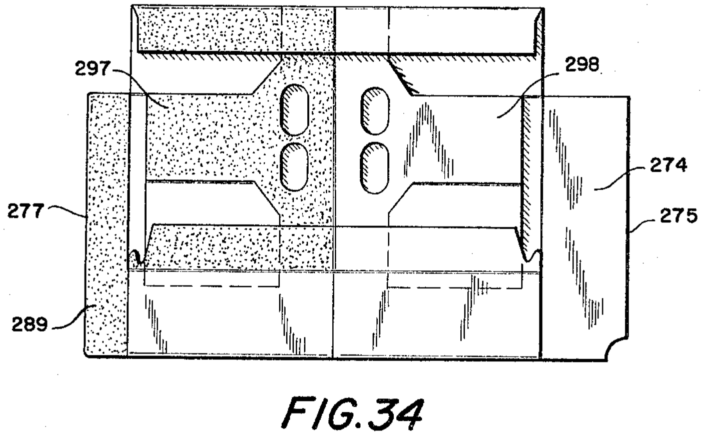
Figure 35:
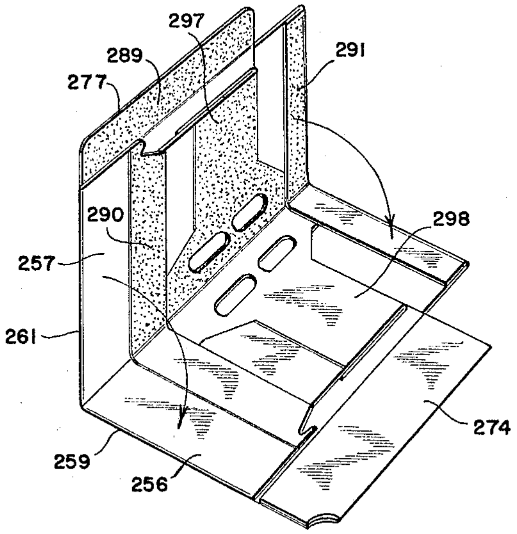

This form of the carton using the blanks 220 and 221 may be assembled in any of the manners previously discussed. The method of assembly is varied slightly in order to accommodate the use of four instead of six flaps. One of the methods is illustrated in FIGS. 30–35, inclusive. First a plastic glue is applied as shown in FIG. 30 on the inner surface of outer blank 221 in areas 281 and 282. Inner blank 220 is then laid upon outer blank 221 with the end flaps 232 and 235 pressed against the plastic glue on areas 281 and 282 respectively. Glue, which may be of a slow drying type, is then placed on areas 283 and 285 on the inner surface of outer blank 221. Inner blank 220 is then turned over while end flaps 232 and 235 adhere to the outer blank due to the quick drying qualities of the plastic glue used for that attachment. Other glued areas may use a glue of a slow drying variety. Glue is then placed on areas 195 and 196 or, in the alternative, it may be placed in the areas equivalent to 87 and 88 of FIG. 9. The next step in folding the outer carton takes place as with previous types of cartons along fold lines 266–267, 259, 261 and 275 and is shown completed in FIG. 34. Glue is then applied to areas 291, 289, 290 as with previous modifications and in this modification the glue is also applied to area 297 which will be adjacent area 298 when folded as in FIG. 35 along the center fold lines or slits of the inner and outer cartons. The carton thus completed when expanded takes the form shown in FIG. 25.

FIGS. 36–38 illustrate the six compartment carton comparable to the eight compartment carton illustrated in FIG. 15. The blanks to form these cartons are illustrated in FIGS. 39 and 40. It should be noted that the outer blank illustrated in FIG. 39 is approximately the same as the outer blank 121 illustrated in FIG. 18 except for longitudinal size due to the difference in the number of compartments. The inner blank illustrated in FIG. 40 is approximately the same configuration as the blank 220 illustrated in FIG. 29. The parts are numbered using the 300 series for parts that are comparable in the other numerical series.

This carton affording greater visibility of contents contained therein and with six compartments to hold six bottles or cans may be assembled in the manner and by any of the methods previously described in connection with the other modifications of this present form of carton.

The eight bottle carton affording the greater visibility and described earlier and numbered in accordance with the 100 series may be modified in a form illustrated in FIGS. 41 and 42. By use of these modified blanks the thickness of the handle is maintained constant throughout and separation of bottles on opposite sides of the carton is more complete due to the greater area of central wall partitioning.

The blank illustrated in FIG. 41 of this modified form of carton is comparable in most essential respects to the blank illustrated in FIG. 18. The differences incorporated in FIG. 41 which give this modified form of the carton its additional advantages are slots 418 and 419 cut into end flaps 463 and 462, respectively in the outer blank 421. The inner blank shown in FIG. 42 is essentially the same as the inner blank shown in FIG. 19 except that the blank of FIG. 42 is shown in a reversed position from the former figure and includes slot 431. Either position may be used in the basic methods of assembly described previously as will be illustrated in FIGS. 43–49 showing the use of one of the previous methods of assembly to assemble this modified carton.

Figure 47:
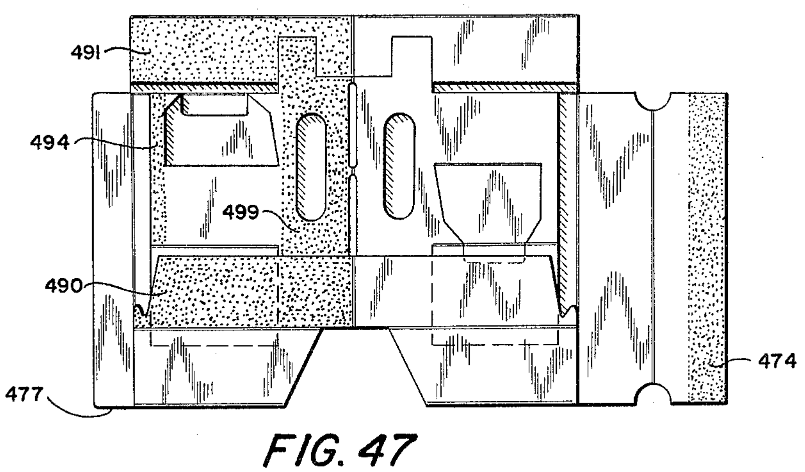
Figures 48, 49:
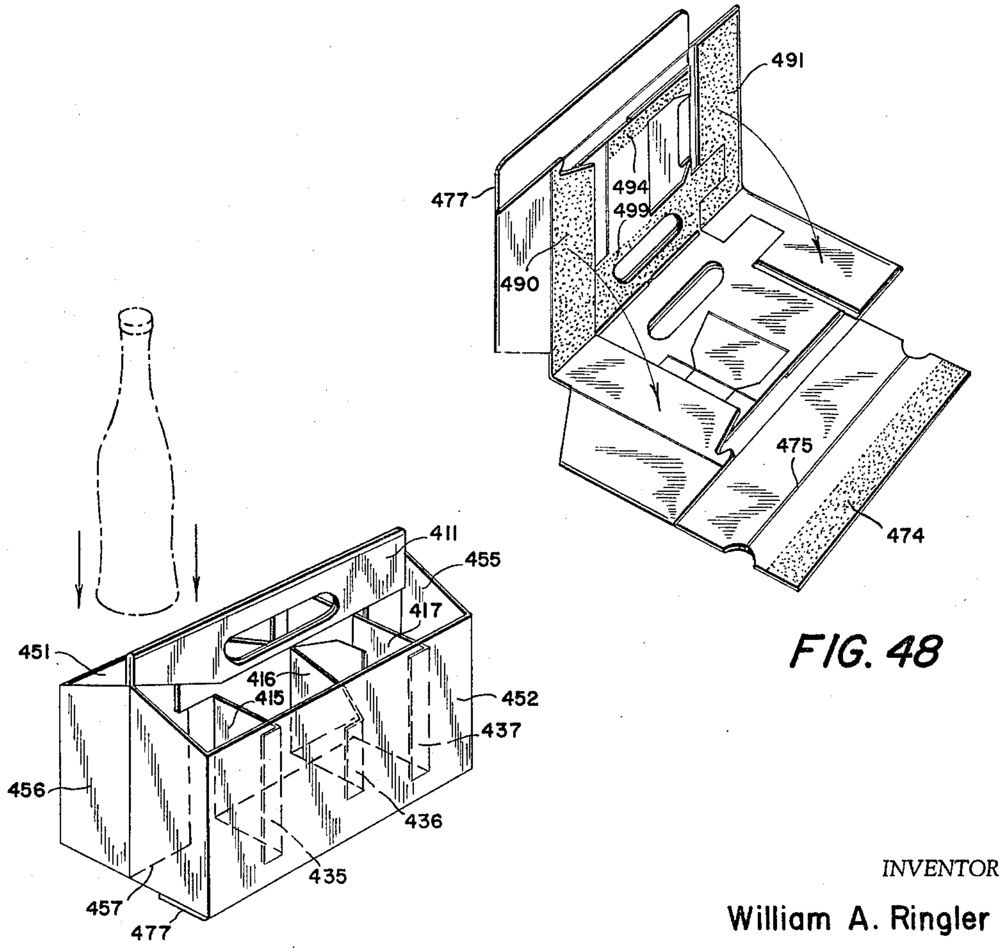

The assembly of this modified carton as shown in FIGS. 43–49 is essentially the same as one of the methods previously described. In fact, any of the methods previously described may be used in the assembly of this modified carton. The only difference in assembly of the modified carton occurs in the fact that the slots 418 and 419 of outer blank 421 must be in a position adjacent to slot 431 when the assembly is completed. This is required in order that the slots and the portions remaining after the slots are cut out will interfit as shown in FIGS. 47 and 48. Otherwise, all methods of assembly apply to this modified form of carton.

It should be noted that when a glue is applied to an area as shown in any of the figures in order to assemble the carton, this glue could just as well be applied to an area that will contact the surface shown as having the glue applied to it. This will obtain the same result. As to which of the surfaces will receive the glue is merely a matter of choice in accordance with the setting up of the machinery to assemble these cartons. One of the instances where this is illustrated is in FIG. 48 where the glue has been applied to part of bottom panel 474 instead of bottom flap 477 as shown in previous methods of assembly. This of course will require panel 474 to be folded at fold line 475 after the carton has been folded along center lines as shown in FIG. 48 instead of as previously shown.

A number of embodiments of the present invention have been illustrated and described but it should be noted that all of the above modifications have common major aspects which allow the blanks to be assembled into the finished cartons by steps which are applicable to all forms of the carton. Also, it should be noted that the principal parts of the structures of the various embodiments of the carton are comparable whether the carton holds six or eight bottles and whether the carton is made to shield the contents or afford greater visibility of the contents.

It will be obvious to those skilled in the art that various changes may be made without departing from the scope of the invention and therefore the invention is not limited to what is shown in the drawings and described in the specification but only as indicated in the appended claims.

What is claimed is:

1. A collapsible carrier for bottles and similar articles comprising
  an outer blank of light paperboard material,
  and a separate piece inner blank of heavier paperboard material than said material of said outer blank and adapted to divide said outer blank into compartments in the assembled carrier and provide the handle for the carrier;
  said outer blank including
    a first side panel,
      a second side panel completely separated from said first side panel by an opening therebetween,
      an end panel hingedly connected to each of said side panels on opposite ends of each of said side panels with adjacent end panels separated from each other by an opening therebetween,
      an end flap hingedly attached to each of said end end panels and to another of said end flaps,
      a pair of bottom panels separated by a fold line and hingedly attached to said first side panel,
      and a bottom flap attached to said second side panel;
  said inner blank including
      a first center panel having at least on dimension equal to a length of a side panel measured between oppositely attached end panels and having a slotted opening therein,
      a second center panel having at least one dimension equal to a length of a side panel measured between oppositely attached end panels and having a slotted opening therein and hingedly attached to said first center panel on a line substantially aligned with the hinged attachment of said end flaps within substantially the range of the thicknesses of said blanks,
      said first and said second center panels each having an equal number of partitioning sections at least partially cut out of said center panels and hingedly connected thereto,
      a partition end flap hingedly connected to each of said partitioning sections,
    and adhesive means attaching each of said partition end flaps to one of said side panels.

2. The collapsible carrier of claim 1, further characterized by at least two of said end flaps having notches and said bottom panel having a notch in cooperative relationship with said notches on said end flaps whereby the carrier is held in expanded assembled position.

3. The collapsible carrier of claim 1, further characterized by
  a handle member hingedly attached to two of said end flaps substantially centered about the hinged connection of said two end flaps and located in the opening between said first side panel and said second side panel and the opening between said end panels which are hingedly connected to said two end flaps.

4. The collapsible carrier of claim 1, further characterized by
  a pair of said partitioning sections in each of said center panels each hingedly connected to said center panel by the edge closest to the other of said partitioning sections.

5. The collapsible carrier of claim 4, further characterized by
  at least one of said partitioning sections in each of said center panels having its partition end flap cut out of one of said partitioning sections in said center panel.

6. The collapsible carrier of claim 1, further characterized by
  at least two of said end flaps adjacent to each other having slots therein,
  and said center panels having a connecting slot therein,
  whereby the slots and parts having said slots interfit in the assembled carrier.

References Cited by the Examiner

UNITED STATES PATENTS

| | | | |
|---|---|---|---|
| 2,418,350 | 4/1947 | Holy | 220—105 |
| 2,563,620 | 8/1951 | Ringler | 220—113 |
| 2,662,683 | 12/1953 | Buttery | 220—113 |
| 2,687,232 | 8/1954 | Arneson | 220—113 |
| 2,760,677 | 8/1956 | Arneson | 220—115 |
| 2,772,610 | 12/1956 | Arneson | 93—49 |
| 2,783,692 | 3/1957 | Bolding | 93—49 |
| 3,053,411 | 9/1962 | Struble et al. | 220—113 |
| 3,107,811 | 10/1963 | Lemon | 220—105 |
| 3,115,273 | 12/1963 | Gish | 220—115 |

GEORGE O. RALSTON, *Primary Examiner.*